(12) United States Patent
Cooley

(10) Patent No.: US 7,590,698 B1
(45) Date of Patent: *Sep. 15, 2009

(54) THWARTING PHISHING ATTACKS BY USING PRE-ESTABLISHED POLICY FILES

(75) Inventor: Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 848 days.

This patent is subject to a terminal disclaimer.

(21) Appl. No.: 11/079,132

(22) Filed: Mar. 14, 2005

(51) Int. Cl.
 *G06F 15/16* (2006.01)
(52) U.S. Cl. ...................................... 709/206
(58) Field of Classification Search ................. 709/206
 See application file for complete search history.

(56) References Cited

U.S. PATENT DOCUMENTS

| | | | |
|---|---|---|---|
| 6,199,102 B1 | 3/2001 | Cobb | |
| 6,366,912 B1* | 4/2002 | Wallent et al. | ................. 707/9 |
| 7,272,853 B2* | 9/2007 | Goodman et al. | ............. 726/13 |
| 7,308,648 B1* | 12/2007 | Buchthal et al. | ............ 715/234 |
| 2002/0019800 A1* | 2/2002 | Shuster | ........................ 705/37 |
| 2005/0210106 A1 | 9/2005 | Cunningham | |
| 2005/0283519 A1* | 12/2005 | Turgeman et al. | ........... 709/206 |
| 2006/0021031 A1* | 1/2006 | Leahy et al. | .................. 726/22 |
| 2006/0101334 A1* | 5/2006 | Liao et al. | ................... 715/523 |
| 2006/0212931 A1* | 9/2006 | Shull et al. | .................... 726/10 |
| 2006/0248573 A1 | 11/2006 | Pannu et al. | |
| 2007/0101423 A1* | 5/2007 | Oliver et al. | ................... 726/22 |
| 2007/0294352 A1 | 12/2007 | Shraim et al. | |
| 2007/0299777 A1 | 12/2007 | Shraim et al. | |
| 2007/0299915 A1* | 12/2007 | Shraim et al. | ................ 709/206 |

OTHER PUBLICATIONS

MengWongl—Sender Permitted From, Dec.2003, [online], [retrieved on Jan. 27, 2009]. Retrieved from the Internet< URL: http://www.openspf.org/svn/project/specs/drafts/draft-mengwong-spf.02.9.4.txt>.*
MengWong—Sender Permitted From, Dec. 2003, [online], [retrieved on Jan. 27, 2009]. Retrieved from the Internet< Url: http://www.openspf.org/svn/project/specs/drafts/draft-mengwong-spf.02.9.4.txt>.*
Dyck, Timothy, "Review: Teros-100 APS 2.1.1", e.Week.com, May 28, 2003, 4 pages, [online] [Retrieved on Oct. 6, 2004] Retrieved from the Internet <URL:http://www.eweek.com/article2/0,1759,1110435,00.asp>.

* cited by examiner

*Primary Examiner*—Andrew Caldwell
*Assistant Examiner*—Michael Chao
(74) *Attorney, Agent, or Firm*—Fenwick & West LLP

(57) ABSTRACT

Methods, apparati, and computer-readable media thwart a phishing attack on a recipient of an electronic message by intercepting the electronic message; extracting a sender domain name from the electronic message; identifying remote links associated with the electronic message; comparing the identified remote links against a pre-established set of acceptable domains, using the extracted sender domain name as an index; and when at least one extracted remote link is not found in the pre-established set of acceptable domains, preventing the message from being delivered to the recipient.

17 Claims, 3 Drawing Sheets

THWARTING PHISHING ATTACKS BY USING PRE-ESTABLISHED POLICY FILES

TECHNICAL FIELD

This invention pertains to the field of preventing phishing attacks on recipients of electronic messages, wherein criminals imitate legitimate companys' electronic messages and Websites to entice recipient account holders to share highly sensitive personal data.

BACKGROUND ART

"Phishing" refers to the activities of criminals who imitate legitimate companys' electronic messages and Websites to entice recipient account holders to share highly sensitive personal data, such as Social Security numbers, users' names, passwords, and/or account numbers. Once acquired, the criminals use the stolen information to commit subsequent crimes.

One of the most common phishing attacks is to modify an existing Website of a trusted brand so that it appears to be part of the trusted company's Website. A spoofed company e-mail is then sent to a recipient with a link to this modified Web page, with a form that solicits the user's credit card data or passwords. When the form is submitted, it sends the data to the criminals while leaving the user on the replica company site. Nothing appears out of the ordinary to the user, who has now become a victim of fraud and has been exposed to potential substantial personal loss and identity theft.

Phishing is extremely dynamic and is growing in both sophistication and volume. The Anti-Phishing Working Group estimates that incidents of phishing attacks are increasing by 50% per month at the time this patent application is being written, and that phishers are able to convince up to 5% of recipients to respond to them.

What is needed is a reliable set of techniques to determine whether a subject electronic message is attempting to send the recipient to a Website that is not part of the Website of a legitimate company.

SUMMARY OF THE INVENTION

Methods, apparati, and computer-readable media for thwarting a phishing attack on a recipient of an electronic message (5). A method embodiment of the present invention comprises the steps of intercepting (31) the electronic message (5); extracting (32) a sender domain name from the electronic message (5); identifying (33) remote links associated with the electronic message (5); comparing (34) the identified remote links against a pre-established set (14) of acceptable domains, using the extracted sender domain name as an index; and when at least one extracted remote link is not found in the pre-established set (14) of acceptable domains, preventing (37) the message (5) from being delivered to the recipient.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
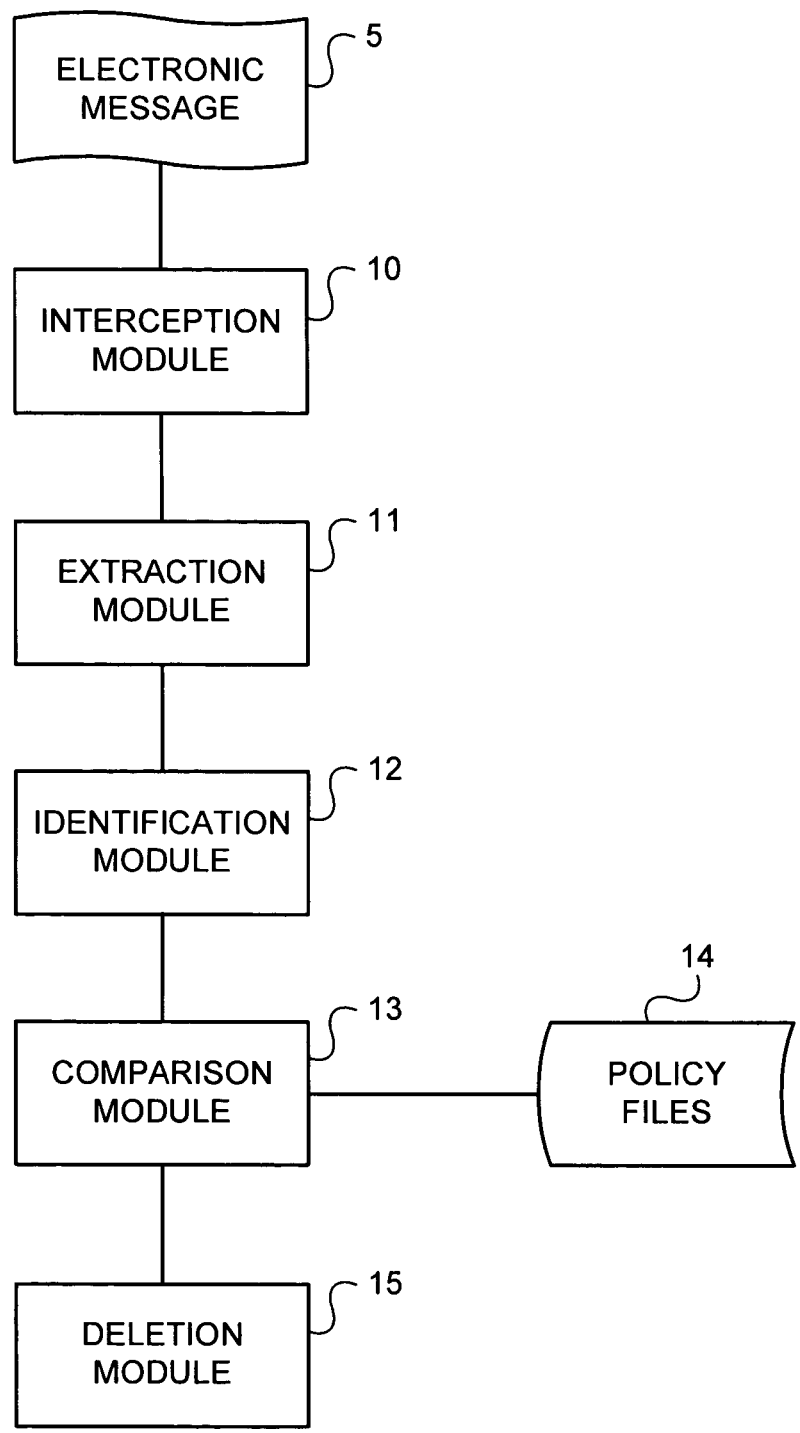
FIG. 1 is a block diagram illustrating an apparatus embodiment of the present invention.

FIG. 1 illustrates apparatus suitable for carrying out the present invention.

Electronic message 5 can be any type of electronic message, such as an e-mail message following the SMTP protocol, a text message following the SMS protocol, or an instant message following the IMPP protocol.

Interception module 10 intercepts electronic messages 5 before they reach the intended recipient. Interception module 10, and its fellow modules 11-15, can be located anywhere in the chain from the messages 5 to the recipient. Thus, these modules can be located at a server, a proxy, a gateway, and/or a client.

Coupled to interception module 10 is extraction module 11, which extracts the domain name of the sender of the electronic message 5.

Coupled to extraction module 11 is identification module 12, which identifies all the remote links contained in electronic message 5 and, optionally, identifies conditions that are flagged within policy files 14.

Coupled to identification module 12 is comparison module 13, which compares the identified remote links and, optionally, the identified flagged conditions, against a pre-established set of acceptable domains contained within policy files 14 that are posted at a fixed location, using the extracted sender domain name as an index to get to the policy file 14 associated with the extracted sender domain name.

Coupled to comparison module 13 is deletion module 15 for preventing the electronic message 5 from being delivered to the recipient when at least one identified remote link is not found in the pre-established set of acceptable domains contained within the relevant policy file 14.

The above describes in a nutshell the whitelist embodiment of the present invention. In an alternative blacklist embodiment, the invention is the same as in the whitelist embodiment, except that comparison module 13 compares the identified remote links, and optionally the identified flagged conditions, against a pre-established set of unacceptable domains (and, optionally, flagged conditions) contained within the relevant policy file 14, again using the extracted sender domain name as an index; and in the blacklist embodiment, deletion module 15 prevents the electronic message 5 from being delivered to the recipient when at least one identified remote link is found in the pre-established set of unacceptable domains contained within the relevant policy file 14 (or when at least one flagged condition corresponds to a pre-established unacceptable flagged condition as specified in the relevant policy file 14).

Modules 10 through 15 can be implemented in any combination of hardware, firmware, and software. When implemented in whole or in part in software, modules 10 through 15 can be embodied on at least one computer readable medium, such as one or more hard disks, floppy disks, CDs, DVDs, etc.

For purposes of illustration only, FIG. 1 illustrates modules 10 through 13 and 15 as being separate and distinct from each other. However, one or more of the functions implemented by modules 10 through 13 and 15 can be combined to form fewer than the illustrated five modules.

Figure 3:
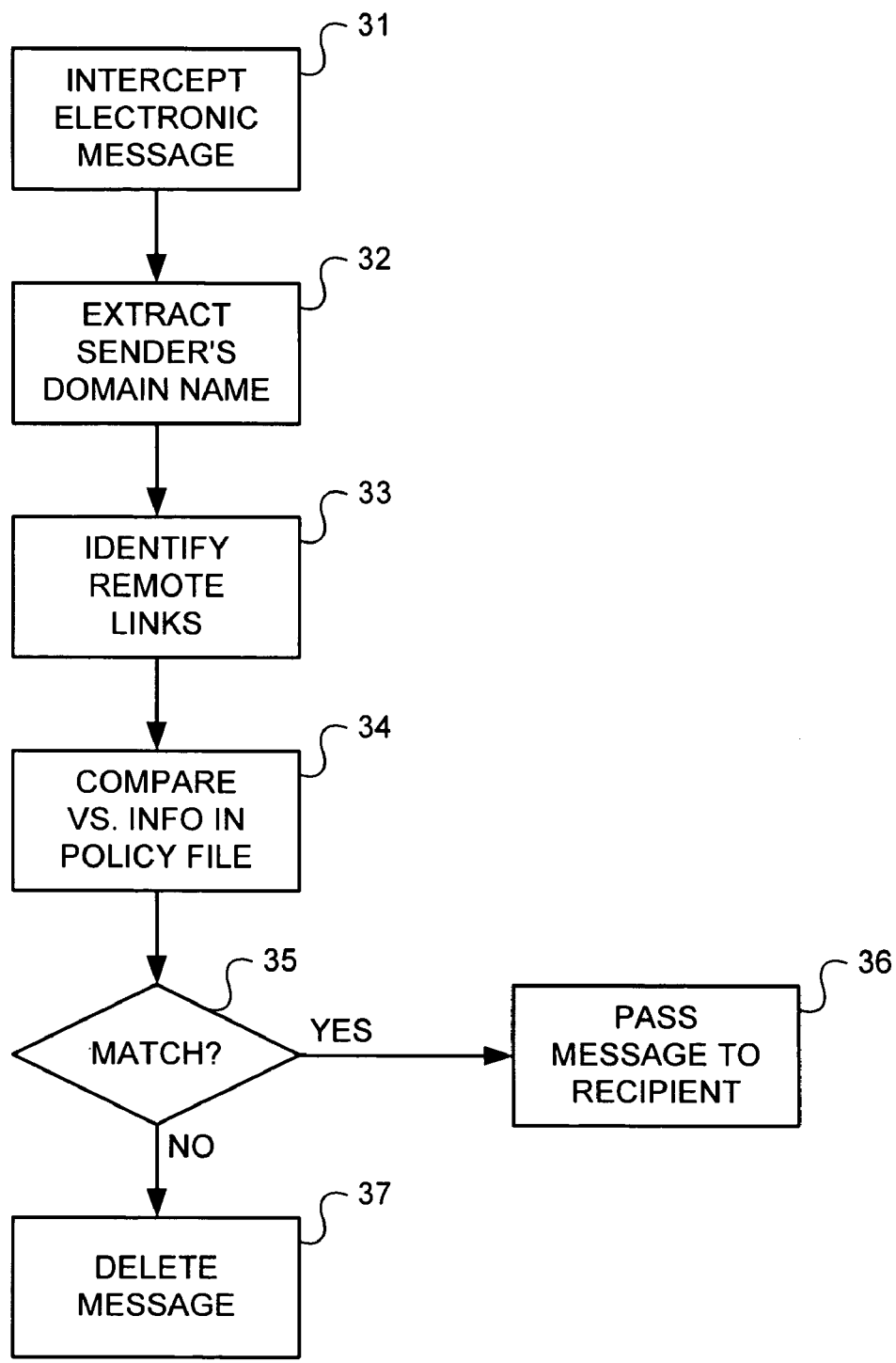
FIG. 3 is a flow diagram illustrating a method embodiment of the present invention.

FIG. 3 illustrates a method embodiment of the present invention. At step 31, interception module 10 intercepts an electronic message 5 for processing.

At step 32, extraction module 11 extracts the domain name of the sender from the intercepted electronic message 5.

At step 33, identification module 12 identifies all the remote links that are contained within electronic message 5. These links are any means by which the sender of the electronic message 5 entices the recipient to go to a remote site. Thus, the links can include anchor tags (links that are blue and underlined in HTML); link tags (links to style sheets, etc.); URLs in text form; and URLs embedded in Web bugs. The Web bugs can include CSS (cascading style sheets, i.e., that part of HTML that describes formats that are used in other sections of HTML; they are "cascaded" because one can inherit from a previous one) and IMG (image tags in HTML). Optionally at step 33, preselected flagged conditions are also identified. Examples of flagged conditions are whether a form is present in electronic message 5 and whether script (part of HTML that is executable) is present in electronic message 5. The reason for wanting to identify forms is that forms are often used by phishers to get a head start in obtaining information, such as Social Security numbers, from recipients on initial screens. The reason for wanting to identify script is that script is widely used by phishers to change URLs at runtime.

At step 34, comparison module 13 compares the remote links, and optionally the flagged conditions, that were identified in step 33, against a pre-established set of acceptable domains, and, optionally, against a pre-established set of flagged conditions, stored in policy files 14, using the sender's domain name that was extracted in step 32 as an index to access the relevant policy file 14 corresponding to the extracted sender domain name. Policy files 14 containing the pre-established set of acceptable domains, and optionally the pre-established acceptable flagged conditions, have been previously compiled by a group of domain owners desirous of thwarting phishing attacks and thereby willing to set up such policy files 14.

For example, let us assume that electronic message 5 is an e-mail sent from CustServe@Citibank.com. In order for this invention to work, the real Citibank must have made a policy file 14 available. File 14 may be, for example, an XML file located at http://www.citibank.com/anti-phishing/policy.xml. This file 14 should be made secure, by means that are known to one of ordinary skill in the security art. This policy.xml file 14 contains a list of legitimate domain names that a real Citibank e-mail 5 could legitimately point the recipient to. In addition, this policy.xml file 14 can also contain a set of flagged conditions such as "script allowed" or "script not allowed"; or "forms allowed" or "forms not allowed". These flagged conditions are another way to narrow what e-mails 5 are passed through to the recipient as being legitimate.

Figure 2:
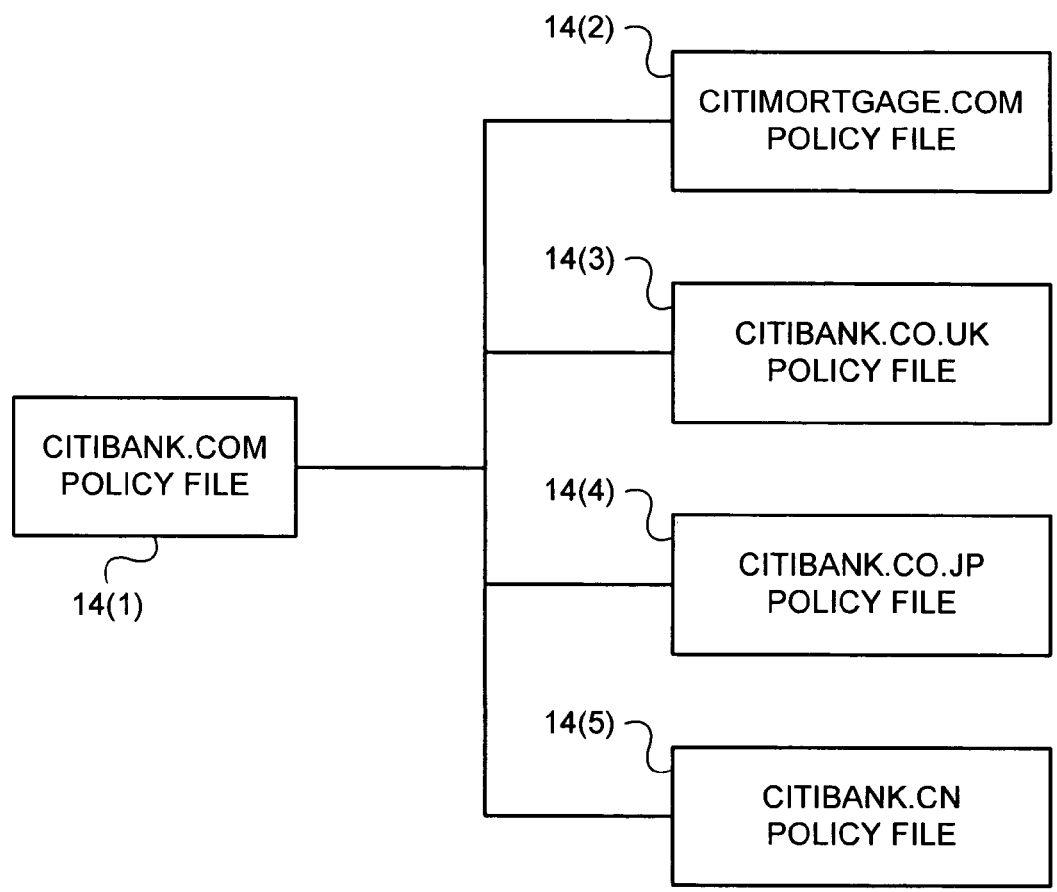
FIG. 2 is a block diagram illustrating an apparatus embodiment of the present invention.

In one embodiment of the present invention, illustrated in FIG. 2, at least one domain owner (in this case Citibank) controls a plurality of sub-domains. In the illustrated embodiment, the sub-domains are Citimortgage.com having its own policy file 14(2), Citibank.co.uk having its own policy file 14(3), Citibank.co.jp having its own policy file 14(4), and Citibank.cn having its own policy file 14(5). Each sub-domain has an entry in the pre-established set 14 of acceptable domains. In this embodiment, each sub-domain entry in the pre-established set 14 of acceptable domains points to a master domain policy file 14(1) maintained by the master domain owner. In this case, this master policy file 14(1) is in the name of Citibank.com. This embodiment enables a large enterprise such as Citibank to post just a single policy file 14(1) rather than, in this case, four separate policy files 14(2) through 14(5). This makes it much easier to update the policies for all of the Citibank sub-domains. In practice, when comparison module 13 accesses the policy file 14(2) for Citimortgage.com, the policy information from master policy file 14(1) is presented to comparison module 13.

By default, the sender's domain is allowed as a legitimate domain in this whitelist embodiment. For example, Citibank.com is allowed in an e-mail from Service@Citibank.com. The list of allowed URLs in policy file 14 allows related entity Web visits, such as an e-mail 5 from CustServe@Citibank.com that asks the recipient to visit http://www.Citimortgage.com.

Returning to FIG. 3, at step 35 comparison module 13 inquires, in the whitelist embodiment, as to whether all of the remote links that were identified in step 33 are found within the pre-established set of acceptable domains contained within the relevant policy file 14, and, optionally, whether all of the flagged conditions satisfy the policies for flagged conditions specified in the relevant policy file 14. If everything matches, comparison module 13 passes message 5 to the recipient at step 36. If, on the other hand, at least one identified remote link is not found in the pre-established set of acceptable domains contained within the relevant policy file 14 (or, in the embodiment in which flagged conditions are employed, if one or more of the flagged conditions is not satisfied), deletion module 15, at step 37, prevents message 5 from being sent to the recipient, i.e., message 5 is blocked or deleted.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for thwarting a phishing attack, said method comprising the steps of:
   intercepting an electronic message intended for display to a recipient of the electronic message;
   extracting a sender domain name from the electronic message;
   identifying one or more domain names in remote links contained in the electronic message;
   determining one or more domain names related to the sender domain name from a pre-established set of domain names that can legitimately appear in remote links contained in the electronic message;
   comparing the one or more domain names in the identified remote links to the one or more domain names related to the sender domain name; and
   preventing, in response to the comparison, the electronic message from being delivered to the recipient.

2. The method of claim 1 wherein the electronic message is a message from the group of messages consisting of:
   electronic mail;
   instant messages; and
   simple text messages.

3. The method of claim 1 further comprising:
   identifying at least one flagged condition established by a controller of the sender domain name and associated with the domain names related to the sender domain name;
   checking whether the at least one flagged condition is satisfied by the electronic message; and
   preventing, in response to the checking, the electronic message from being delivered to the recipient.

4. The method of claim 3 wherein the at least one flagged condition is a condition from the group of conditions consisting of:

whether script is present in the electronic message; and
whether a form is present in the electronic message.

5. The method of claim 3 wherein the pre-established set of domain names is established by a controller of the sender domain name.

6. The method of claim 1 wherein the intercepting, extracting, comparing, and preventing steps are performed at least one location from the group of locations consisting of:
- a server;
- a proxy;
- a gateway; and
- a client.

7. The method of claim 1 wherein at least one remote link is a link from the group of links consisting of:
- anchor tags;
- link tags;
- URLs in text form; and
- URLs embedded in Web bugs.

8. The method of claim 7 wherein at least one Web bug is a bug from the group of bugs consisting of:
- CSS; and
- IMG.

9. The method of claim 1 wherein determining the one or more domain names related to the sender domain name further comprises using the sender domain name as an index to the pre-established set of domain names.

10. At least one computer-readable medium containing computer program instructions for thwarting a phishing attack, said computer program instructions performing the steps of:
- intercepting an electronic message intended for display to a recipient of the electronic message;
- extracting a sender domain name from the electronic message;
- identifying one or more domain names in remote links contained in the electronic message;
- determining one or more domain names related to the sender domain name from a pre-established set of domain names that can legitimately appear in remote links contained in the electronic message;
- comparing the one or more domain names in the identified remote links to the one or more domain names related to the sender domain name; and
- preventing, in response to the comparisons the electronic message from being delivered to the recipient.

11. The at least one computer-readable medium of claim 10 wherein the electronic message is a message from the group of messages consisting of:
- electronic mail;
- instant messages; and
- simple text messages.

12. The at least one computer-readable medium of claim 10 further comprising:
- identifying at least one flagged condition established by a controller of the sender domain name and associated with the domain names related to the sender domain name;
- checking whether the at least one flagged condition is satisfied by the electronic message; and
- preventing, in response to the checking, the electronic message from being delivered to the recipient.

13. The at least one computer-readable medium of claim 12 wherein the at least one flagged condition is a condition from the group of conditions consisting of:
- whether script is present in the electronic message; and
- whether a form is present in the electronic message.

14. The at least one computer-readable medium of claim 10 wherein the pre-established set of domain names is established by a controller of the sender domain name.

15. The at least one computer-readable medium of claim 10 wherein the intercepting, extracting, comparing, and preventing steps are performed at least one location from the group of locations consisting of:
- a server;
- a proxy;
- a gateway; and
- a client.

16. The at least one computer-readable medium of claim 10 wherein at least one remote link is a link from the group of links consisting of:
- anchor tags;
- link tags;
- URLs in text form; and
- URLs embedded in Web bugs.

17. The at least one computer-readable medium of claim 16 wherein at least one Web bug is a bug from the group of bugs consisting of:
- CSS; and
- IMG.

* * * * *

UNITED STATES PATENT AND TRADEMARK OFFICE
CERTIFICATE OF CORRECTION

PATENT NO. : 7,590,698 B1  Page 1 of 1
APPLICATION NO. : 11/079132
DATED : September 15, 2009
INVENTOR(S) : Shaun P. Cooley It is certified that error appears in the above-identified patent and that said Letters Patent is hereby corrected as shown below:

In claim 5, Column 5, Line 3, after "The method of claim" please delete "3" and add --1--.

In claim 6, Column 5, Line 7, after "steps are performed at" please add --at--.

In claim 10, Column 5, Line 44, after "in response to the" please delete "comparisons" and add --comparison,--.

In claim 15, Column 6, Line 27, after "steps are performed at" please add --at--.

Signed and Sealed this

Twenty-fourth Day of November, 2009

David J. Kappos
*Director of the United States Patent and Trademark Office*